United States Patent
Yang et al.

(10) Patent No.: US 10,160,066 B2
(45) Date of Patent: Dec. 25, 2018

(54) METHODS AND SYSTEMS FOR REINFORCED ADHESIVE BONDING USING SOLDER ELEMENTS AND FLUX

(71) Applicant: GM Global Technology Operations LLC, Detroit, MI (US)

(72) Inventors: Xin Yang, Beijing (CN); Blair E. Carlson, Ann Arbor, MI (US); Yongbing Li, Shanghai (CN)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 67 days.

(21) Appl. No.: 15/340,651

(22) Filed: Nov. 1, 2016

(65) Prior Publication Data

US 2018/0117716 A1    May 3, 2018

(51) Int. Cl.
*B23K 31/02*   (2006.01)
*B23K 35/365*   (2006.01)
*B23K 1/20*   (2006.01)
*B23K 35/02*   (2006.01)

(52) U.S. Cl.
CPC .......... *B23K 35/365* (2013.01); *B23K 1/203* (2013.01); *B23K 35/025* (2013.01)

(58) Field of Classification Search
CPC .......... B23K 1/00–1/206; B23K 3/082; B23K 35/36; B23K 35/362; B23K 2201/36–2201/42; B23K 35/025
USPC .......... 228/41, 179.1–180.22, 245–262, 207, 228/214, 223–224
See application file for complete search history.

(56) References Cited

U.S. PATENT DOCUMENTS

| | | | | |
|---|---|---|---|---|
| 5,445,308 A | * | 8/1995 | Nelson | C09J 9/02 228/121 |
| 5,556,023 A | * | 9/1996 | Kuramoto | B23K 3/0607 228/248.1 |
| 5,919,317 A | * | 7/1999 | Tanahashi | B23K 35/3612 148/22 |
| 5,985,043 A | * | 11/1999 | Zhou | B23K 35/025 148/24 |

(Continued)

FOREIGN PATENT DOCUMENTS

JP    2000133680 A    *   5/2000
WO    2015154236        10/2015

(Continued)

*Primary Examiner* — Kiley S Stoner
(74) *Attorney, Agent, or Firm* — Parks IP Law LLC

(57) ABSTRACT

The present disclosure relates a bonding system formed by a process that provides a first substrate and a second substrate. A flux coating is applied to the first contact surface, and a solder-adhesive mixture comprising an adhesive and a plurality of solder elements in at least a portion of the adhesive is applied to the first contact surface. The second substrate is positioned adjacent the solder-adhesive mixture much that a second contact surface of the second surface is opposite the first contact surface, and heat is applied to the solder-adhesive mixture by way of at least one of the first and second contact surfaces. The solder-adhesive mixture is heated to a temperature that is intended to at least partially melt or at least partially vaporize the flux coating upon contact to promote a bonding condition between the solder-adhesive mixture and the first substrate.

13 Claims, 2 Drawing Sheets

I    II    III

(56) References Cited

U.S. PATENT DOCUMENTS

| | | | | |
|---|---|---|---|---|
| 5,985,456 | A * | 11/1999 | Zhou | B23K 35/025 148/24 |
| 6,017,634 | A * | 1/2000 | Capote | B23K 35/025 257/E21.514 |
| 6,114,413 | A * | 9/2000 | Kang | C08K 9/02 523/205 |
| 6,120,885 | A * | 9/2000 | Call | H01L 23/49816 257/698 |
| 6,238,599 | B1 * | 5/2001 | Gelorme | H01B 1/22 252/512 |
| 6,297,559 | B1 * | 10/2001 | Call | H01L 21/4853 228/180.22 |
| 6,518,677 | B1 * | 2/2003 | Capote | B23K 35/025 257/778 |
| 6,590,287 | B2 * | 7/2003 | Ohuchi | H01L 21/563 228/180.22 |
| 6,774,497 | B1 * | 8/2004 | Qi | H01L 21/563 257/783 |
| 6,802,446 | B2 * | 10/2004 | Chaudhuri | C09J 9/02 228/175 |
| 6,915,944 | B1 * | 7/2005 | Takaya | B23K 35/3613 148/23 |
| 7,017,795 | B2 * | 3/2006 | Liu | B23K 35/025 148/23 |
| 7,135,770 | B2 * | 11/2006 | Nishiyama | H01L 21/563 257/734 |
| 7,331,502 | B2 * | 2/2008 | Okada | H01L 21/486 228/180.22 |
| 7,588,968 | B1 * | 9/2009 | Zarbock | H01L 21/563 257/E21.503 |
| 2001/0020744 | A1 * | 9/2001 | Kuramoto | B23K 3/0623 257/738 |
| 2001/0025874 | A1 * | 10/2001 | Nishiyama | B23K 1/0016 228/180.22 |
| 2002/0005247 | A1 * | 1/2002 | Graham | C09J 9/02 156/291 |
| 2002/0046627 | A1 * | 4/2002 | Amita | B23K 35/0244 75/252 |
| 2002/0089067 | A1 * | 7/2002 | Crane | H01L 21/563 257/778 |
| 2002/0142517 | A1 * | 10/2002 | Maeda | H01L 24/81 438/108 |
| 2003/0176599 | A1 * | 9/2003 | Kirsten | B23K 35/025 525/523 |
| 2003/0209590 | A1 * | 11/2003 | Fortin | H05K 3/305 228/180.22 |
| 2004/0105223 | A1 * | 6/2004 | Okada | H01L 21/486 361/679.01 |
| 2004/0185601 | A1 * | 9/2004 | Stepniak | H01L 21/563 438/108 |
| 2005/0218195 | A1 * | 10/2005 | Wilson | B23K 35/3613 228/180.22 |
| 2005/0224560 | A1 * | 10/2005 | Takesue | B23K 1/0016 228/180.22 |
| 2006/0043543 | A1 * | 3/2006 | Wada | B23K 35/262 257/666 |
| 2006/0043597 | A1 * | 3/2006 | Wada | B23K 35/025 257/772 |
| 2007/0207605 | A1 * | 9/2007 | Shiu | H01L 21/4853 438/613 |
| 2007/0221710 | A1 * | 9/2007 | Akamatsu | B23K 1/203 228/223 |
| 2007/0221711 | A1 * | 9/2007 | Wada | B23K 35/362 228/248.1 |
| 2007/0277909 | A1 * | 12/2007 | Tsukahara | B23K 35/0244 148/24 |
| 2008/0048009 | A1 * | 2/2008 | Maeda | B23K 35/0244 228/208 |
| 2008/0165518 | A1 * | 7/2008 | Ichiryu | H01L 21/4853 361/803 |
| 2009/0233117 | A1 * | 9/2009 | Sakai | H05K 3/3484 428/551 |
| 2010/0101845 | A1 * | 4/2010 | Kishi | B23K 1/0016 174/259 |
| 2010/0159257 | A1 * | 6/2010 | Yamaguchi | B23K 35/025 428/457 |
| 2011/0089567 | A1 * | 4/2011 | Ishikawa | B23K 35/262 257/772 |
| 2011/0296680 | A1 * | 12/2011 | Dennis | H05K 3/3436 29/840 |
| 2013/0048359 | A1 * | 2/2013 | Ihara | H05K 3/3484 174/258 |
| 2013/0234317 | A1 * | 9/2013 | Chen | H01L 25/50 257/737 |
| 2013/0334291 | A1 * | 12/2013 | Eom | H01L 24/81 228/141.1 |
| 2014/0073088 | A1 * | 3/2014 | Maeda | H05K 13/0465 438/107 |
| 2014/0231492 | A1 * | 8/2014 | Saeki | H05K 3/3436 228/180.22 |
| 2015/0044465 | A1 * | 2/2015 | Ganbe | B23K 35/0227 428/378 |
| 2017/0021602 | A1 * | 1/2017 | Yang | H05K 3/368 |
| 2017/0120396 | A1 * | 5/2017 | Ohashi | H05K 3/3489 |
| 2017/0129208 | A1 * | 5/2017 | Yang | B32B 7/12 |
| 2017/0188468 | A1 * | 6/2017 | Hino | H01L 24/13 |
| 2018/0036818 | A1 * | 2/2018 | Prokopiak | B23K 1/0016 |

FOREIGN PATENT DOCUMENTS

| | | |
|---|---|---|
| WO | 2015015189 | 2/2016 |
| WO | 2016015188 | 2/2016 |

* cited by examiner

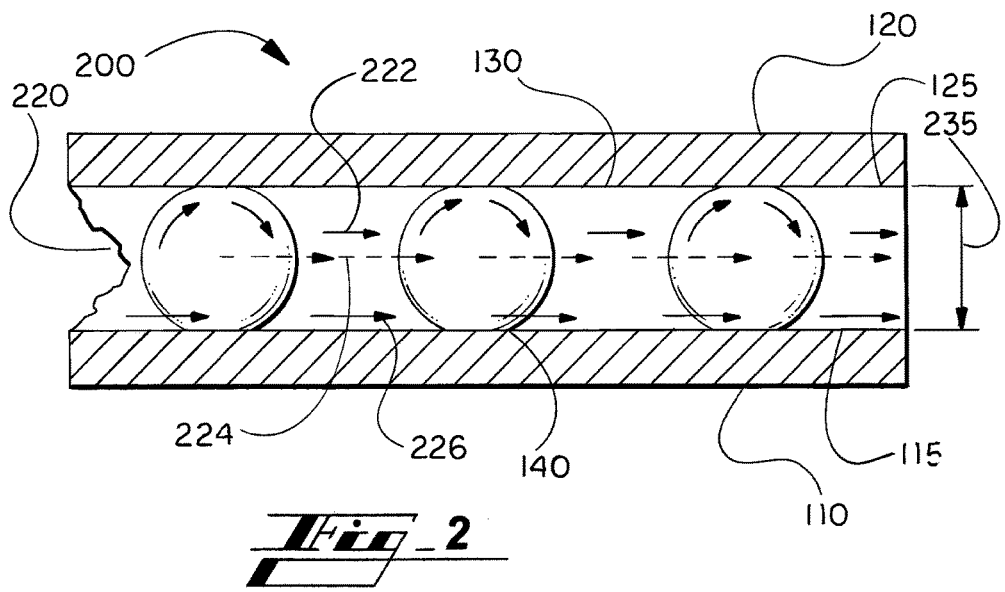
Fig_2
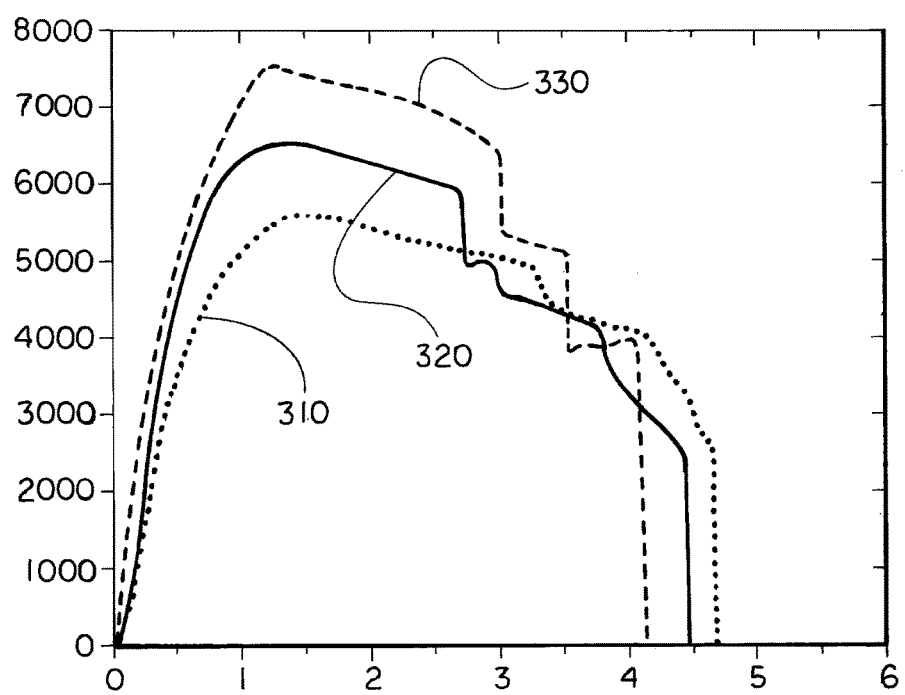
Fig_3

METHODS AND SYSTEMS FOR REINFORCED ADHESIVE BONDING USING SOLDER ELEMENTS AND FLUX

TECHNICAL FIELD

The present technology relates to adhesive bonding for substrate materials. More specifically, the technology improves peel strength by providing interlock between solder elements of a solder-reinforced adhesive and substrates during bonding.

BACKGROUND

Structural adhesives replace welds and mechanical fasteners in many applications because structural adhesives increase fatigue life and reduce failure commonly found around welds and fasteners. Structural adhesives can also be preferred over welds and mechanical fasteners where resistance to flex and vibration is desired.

When structural adhesives are applied to substrate surfaces, a bond line forms at the meeting of the substrate surfaces. It is critical for optimal performance in these cases for the bond line to have uniform thickness.

When a substantial force is applied, structural adhesives used in adhesive bonding may be loaded and fracture (1) normal to the bond line, which can create a peeling effect causing substrate materials to be on different planes (i.e., peel fracture), or (2) perpendicular to the leading edge of a fracture, whether in-plane or out-of-plane, which creates a shearing effect where substrate materials remain on the same plane (i.e., shear fracture). While fracturing is typically avoided, if there is to be fracturing, shear fracture is preferred over peel fracture because shear fracture requires more external loading than peel fracture to produce failure.

Solder material, in the form of solder elements, can be added to adhesives to improve bonding with substrate surfaces. However, impurities (e.g., dirt) and films (e.g., oxide) formed on substrate surfaces and solder material can prevent the solder elements from adequately bonding to the substrate surfaces, preventing sufficient interlock.

SUMMARY

A need exists for a structural adhesive that provides robust interlock between the solder material and adhesive material to inhibit crack propagation or promote propagation along a fracture path requiring an amount of energy greater than a fracture energy needed to propagate a crack directly through a bond line. The adhesive would obtain optimal interlock where impurities are removed from substrate surfaces and solder elements. The adhesive would also improve peel strength of a bonded joint.

In one aspect, the present technology includes a bonding system having a first and second substrate; an adhesive in contact with a first contact surface of the first substrate and a second contact surface of the second substrate, opposite the first contact surface; and a plurality of solder elements positioned in the adhesive, forming a solder-reinforced adhesive.

The bonding system is formed by a process that provides the first substrate and the second substrate. Next, a flux coating is applied to the first contact surface, and a solder-adhesive mixture comprising the adhesive and the plurality of solder elements in at least a portion of the adhesive is applied to the first contact surface. In some embodiments, the flux coating is applied to the second contact surface prior to application of the solder-adhesive mixture. The process also includes positioning the second contact surface adjacent the solder-adhesive mixture, and applying heat to the solder-adhesive mixture by way of at least one of the first and second contact surfaces. The solder-adhesive mixture is heated to a temperature that is intended to at least partially melt or at least partially vaporize the flux coating upon contact to promote a bonding condition between the solder-adhesive mixture and the first substrate.

In some embodiments, at least one of the plurality of solder elements is in contact with the first contact surface. In some embodiments, at least one of the plurality of solder elements is in contact with the first contact surface and the second contact surface. In some embodiments, the plurality of solder elements are positioned within the adhesive inhibit crack propagation or promote crack propagation along a path requiring, in at least one section of the bonding system, an amount of energy that is greater than a fracture energy needed to propagate a crack generally straight through a bond line of adhesive sans the plurality of solder elements.

In a further aspect, the present technology includes methods to produce a solder-reinforced adhesive bond joining a first substrate and a second substrate. The method includes applying a flux coating to a first contact surface of the first substrate, and applying a solder-adhesive mixture to the first contact surface. The solder-adhesive mixture comprises a structural adhesive and a plurality of solder elements. The method also includes positioning a second contact surface of the second substrate in contact with the solder-adhesive mixture, and the second contact surface is opposite the first contact surface. The method further includes applying heat to the solder-adhesive mixture by way of at least one of the first and second contact surfaces. In doing so, the flux coating is at least partially melted or at least partially vaporized, and the plurality of solder elements reaches a solder-element bonding temperature.

In some embodiments, the solder-adhesive mixture is heated in a mixer prior to application of the solder-adhesive mixture to the first contact surface. In some embodiments, the solder-adhesive mixture is heated to a flux melting temperature. In some embodiments, each of the plurality of solder elements is generally spherical.

In another aspect, the present technology includes methods to produce a solder-reinforced adhesive bond joining a first substrate and a second substrate. The method includes applying a flux coating to a first contact surface of the first substrate and applying an adhesive to the first contact surface. The method further includes positioning within the adhesive, applied to the first contact surface, a plurality of solder elements and positioning, opposite the first contact surface, a second contact surface of the second substrate in contact with the solder-reinforced adhesive. The method further includes applying heat to the solder-reinforced adhesive by way of at least one of the first and second contact surfaces. In doing so, the flux coating is at least partially melted or at least partially vaporized, and the plurality of solder elements reaches a solder-element bonding temperature.

Other aspects of the present technology will be in part apparent and in part pointed out hereinafter.

DESCRIPTION OF THE DRAWINGS

FIG. 2 illustrates a side view of the bonding system according to the method of FIG. 1.

FIG. 3 is a graph illustrating load and displacement of (i) a pure adhesive, (ii) an adhesive including solder elements, and (iii) an adhesive including solder elements where a flux treatment is applied to a workpiece prior to joining.

Figure 1:
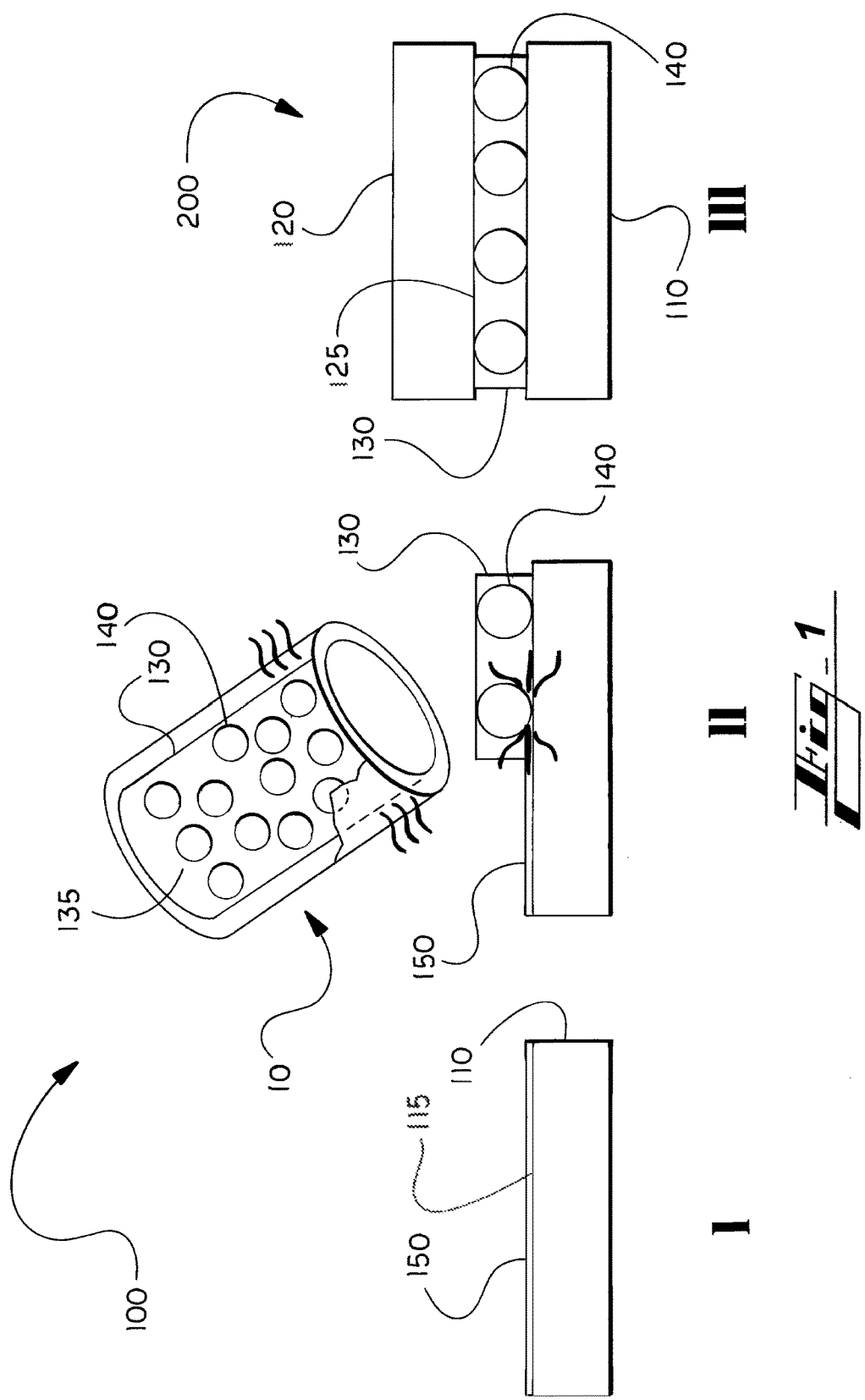
FIG. 1 illustrates a method of assembling an exemplary embodiment of a bonding system.

The figures are not necessarily to scale and some features may be exaggerated or minimized, such as to show details of particular components. In some instances, well-known components, systems, materials or methods have not been described in detail in order to avoid obscuring the present disclosure. Specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, exemplary, illustrative, and similar terms, refer expansively to embodiments that serve as an illustration, specimen, model or pattern.

Descriptions are to be considered broadly, within the spirit of the description. For example, references to connections between any two parts herein are intended to encompass the two parts being connected directly or indirectly to each other. As another example, a single component described herein, such as in connection with one or more functions, is to be interpreted to cover embodiments in which more than one component is used instead to perform the function(s). And vice versa—i.e., descriptions of multiple components described herein in connection with one or more functions are to be interpreted to cover embodiments in which a single component performs the function(s).

In some instances, well-known components, systems, materials, or methods have not been described in detail in order to avoid obscuring the present disclosure. Specific structural and functional details disclosed herein are therefore not to be interpreted as limiting, but merely as a basis for the claims and as a representative basis for teaching one skilled in the art to employ the present disclosure.

The present technology can be used in a wide variety of applications, including in connection with manufacturing components of automobiles, other vehicles, such as marine craft and aircraft, and non-vehicle apparatus.

FIG. 1 illustrates a method 100 of assembling an exemplary embodiment of a bonding system 200. The bonding system 200 includes a structural adhesive 130 and solder elements 140 which are used to join a first substrate 110 to a second substrate 120.

The substrates 110, 120 are the objects that require bonding to one another. The substrates 110, 120 may include the same or different materials. Substrates can include one or more materials such as aluminum, steel, magnesium, composite, or the like.

The adhesive 130 is a structural material used to bond a first contact surface 115 of the first substrate 110 to a second contact surface 125 of the second substrate 120. The adhesive 130 may be composed of any number of thermosetting or thermoplastics materials that are intended to bear a load (e.g., shear load) produced by the substrate(s) 110, 120. For example, the adhesive 130 contains any of epoxies, toughened acrylics, polyurethanes, cyanoacrylates, anaerobics, phenolics, vinyl acetates, and the like.

The solder elements 140 are used in conjunction with the adhesive 130 to form a bridge between the substrates 110, 120. The solder elements 140 can bond to at least one of the substrates 110, 120 during a manufacturing process (e.g., a curing process).

The solder elements 140 promote arresting a developed crack (e.g., crack 220) along one or more fracture paths, such as exemplary fracture paths 222, 224, or 226 illustrated and discussed in association with FIG. 2. As described further below, a crack extending along the fracture path(s) requires more fracture energy to form and/or propagate than a crack would if extending generally straight through a bond line not having solder elements. The bonding system 200 of the present technology thus have higher energy-absorption capability. For example, the first fracture path 222 propagates to, through, or around one or more of the solder elements 140, which require higher energy absorption than a crack extending generally straight through the bond line.

The solder elements 140 are sized and shaped to contact at least one of the substrates 110, 120. If contact with both of the substrates 110, 120 is desired, the solder elements 140 can be configured to have a dimension approximately equal to or slightly larger than a bond line thickness 235. For contacting only on one of the substrates 110 or 20, the solder elements 140 can be sized (e.g., have a height that is) slightly smaller than the bond line thickness 235. In a contemplated embodiment, solder elements 140 could be sized, at least smaller than the bond line thickness 235, so that they might not directly contact either substrate 110, 120 when positioned between them.

The solder elements 140 may include any commercially available material or a custom composition. For example, where at least one of the substrates 110, 120 is at least partially composed of metal and/or metal composites, the solder elements 140 may include materials such as, but not limited to tin (Sn), lead (Pb), and copper (Cu). However, where at least one of the substrates 110, 120 is at least partially composed of polymer and/or a polymer composite, the solder element 140 composition may include polymer materials such as, but not limited to, polycarbonate (PC).

In some embodiments, the solder elements 140 have a generally spherical shape, which promotes a more uniform distribution of the solder elements 140 throughout the adhesive 130. However, the solder elements 140 may include other shapes such as, but not limited to, cones, cylinders, rectangular blocks, the like or other.

As illustrated in FIG. 1, the method of assembling the bond system 200 includes (I) applying a flux coating 150 to at least one of the contact surfaces 115, 125, (II) applying a solder-adhesive mixture 135 (i.e., the adhesive 130 including the solder elements 140) to the contact surface, and (III) joining the second substrate 120 to the solder-adhesive mixture 135. In various embodiments, the adhesive 130 and solder elements 140 can be applied in any manner. For example, the adhesive 130 can be applied to the first substrate 110, and then the solder elements 140 added thereto.

In the illustrated example, at step I, the flux coating 150 is applied to the first contact surface 115 and/or the second contact surface 125. The flux coating 150 may be used, for example, where the contact surface(s) 115, 125 are not pre-cleaned (e.g., using a wire brush) prior to bonding.

The flux coating 150 chemically cleans oxidation and contaminates from the contact surface(s) 115, 125. The flux coating 150 improves the interface of the adhesive 130 and solder elements 140 with the contact surfaces 115, 125 through removing impurities at the site of the bond (e.g., dirt, oil, or oxidation). The flux coating also protects the contact surface(s) 115, 125 and the solder elements 140 from subsequent atmospheric contamination and/or oxidation. Cleaning the contact surfaces 115, 125 prior to bonding contributes to desired formation of a bond, and protecting the contact surface(s) 115, 125 from subsequent contamination after bonding contributes to durability of the bond.

The flux coating 150 improves bonding (e.g., wetting) by enhancing the interface between the solder elements 140 and the contact surface(s) 115, 125. The enhanced bonding forces cracks (e.g., crack 220) to arrest propagation. Alternatively, the enhanced boding forces cracks to alter the path of fracture to one of the solder elements 140 to promote failure in shear mode through the adhesive 130 adjacent the solder element 140.

The flux coating 150 may be a cleaning agent that promotes soldering, brazing, or welding by removing oxidation from the metals to be joined. Materials suitable for the flux coating 150 include but are not limited to ammonium chloride, rosin (natural or chemically modified), hydrochloric acid, zinc chloride, and borax.

The flux coating 150 may be sprayed, brushed, wiped, or otherwise applied to the contact surface(s) 115, 125 using any of a number of applicators such as, but not limited to spray nozzles and brushes.

At step II, the solder-adhesive mixture 135 is applied to the contact surface 115, 125. In some embodiments (as shown), the solder-adhesive mixture 135 is heated, as indicated schematically by the heat symbols emanating from the mixer 10. Heating the solder-adhesive mixture 135 prior to application on the contact surface 115, 125 raises the solder-adhesive mixture 135 to a temperature sufficient to partially or fully melt or partially vaporize (e.g., evaporate) any of the flux coating 150 that may still be on the surfaces 115, 125, preventing absorption of the flux coating 150 into the solder-adhesive mixture 135.

In some embodiments, the solder-adhesive mixture 135 is heated and then added to a mixer 10 prior to application to the contact surface(s) 110, 120. In some embodiments, the solder-adhesive mixture 135 is heated while in the mixer 10. In a contemplated embodiment, the solder elements 140 are heated, thereby heating the adhesive 130 when they are combined. In another contemplated embodiment, one or both substrates 110, 120 are heated instead of or along with heating the solder-adhesive mixture 135. In one embodiment, the adhesive 130 is heated separately from the solder elements 140. In one contemplated embodiment, the solder-adhesive mixture 135, or each part thereof (i.e., adhesive 130, solder element 140), is not heated prior to being applied to the substrate(s) 110, 120. These and other heating options are described further below.

In some embodiments, the mixer 10 may include a spray nozzle (not shown) that is sized and shaped for application of the solder-adhesive mixture 135 to the contact surface(s) 115, 125. For example, for implementations in which it is preferred that the flux coating 150 be melted, the spray nozzle is in some cases cylindrical in shape, and for implementations in which it is preferred that the flux be vaporized, the spray nozzle is in some cases flat.

In some embodiments where the solder-adhesive mixture 135, or part(s) thereof, is heated, the solder-adhesive mixture 135 reaches a temperature that will at least partially melt or partially vaporize the flux coating 150 upon contact between the solder-adhesive mixture 135, or part(s) thereof, and the coating 150 on the contact surface(s) 115, 125 when the solder-adhesive mixture 135 or part(s) thereof is applied. As illustrated toward the right in step II of FIG. 1, where the solder-adhesive 135 has already been applied, the flux coating 150 is melted or vaporized. And where the solder-adhesive 135 is currently being applied, the flux coating 150 is being melted or vaporized, as indicated by the heat symbols between the solder-adhesive mixture 135 and lower substrate. Where the solder-adhesive 135 has not yet been applied, the flux coating 150 is still present.

The temperature of the solder-adhesive mixture 135 is such that the adhesive 130 is below a transition temperature (e.g., transition temperature of glass beads within an adhesive). Additionally, the temperature of the solder-adhesive mixture 135 is lower than a temperature at which the solder elements 140 transition from a solid state to a softened or malleable state. For example, the solder-adhesive mixture 135 is heated to a temperature between 100 and 140 degrees Celsius where the solder balls 140 are at least partially composed of tin and lead (SnPb).

As mentioned above, in some embodiments, the adhesive 130 may be heated independent of the solder elements 140 and applied to the first contact surface 115. Heating the adhesive 130 independent of the solder elements 140 allows the adhesive 130 to be heated to a temperature that may be greater than the temperature at which the solder elements 140 transition from a solid state to a malleable state.

In these embodiments, the heated adhesive 130 melts or vaporizes the flux coating 150 upon application of the heated adhesive 130 to the first contact surface 115. Before or after the heated adhesive 130 is applied to one or both substrates, the solder elements 140 can be subsequently positioned within the heated adhesive 130, forming a solder-adhesive.

In some embodiments, the solder-adhesive mixture 135 (or the solder-reinforced adhesive) is heated when a heat source (e.g., heat spot) is applied to one of the substrates 110, 120. Heat applied to the substrate(s) 110, 120 is transferred through substrate material to the contact surface(s) 115, 125, which heats the solder-adhesive mixture 135. Heating the solder-adhesive mixture 135 by way of the substrate(s) 110, 120 may be useful, for example, where the mixer 10 is unavailable.

At step III, the second substrate 120 is positioned in contact with the solder-adhesive mixture 135 (or solder-reinforced adhesive), forming the bonding system 200. Specifically, the second contact surface 125 is positioned in contact with solder-adhesive mixture 135, opposite the first contact surface 115.

Once assembled, the bonding system 200 may undergo additional manufacturing processing, such as but not limited to curing. For example, heat is applied to the solder-adhesive mixture 135 (or the solder-reinforced adhesive) by way of at least one of the contact surfaces 115, 125.

FIG. 2 illustrates the bonding system 200 that has developed the crack 220.

The crack 220 may (i) propagate along a first fracture path 222 (depicted as a series of short solid arrows), (ii) propagate along a second fracture path 224 (depicted as a series of dashed arrows), (iii) propagate along a third fracture path 226 (depicted as a series of long solid arrows), or (iv) arrest at an interface of the adhesive 130 and the solder element 140, such as generally where the crack 220 first reaches the solder element 140.

The fracture paths 222, 224, 226 correlate generally to a path of least resistance for any fracture. Because the adhesive 130 is generally weaker than the substrates 110, 120 and the solder elements 140, the fracture paths may extend through the adhesive 130 as illustrated by the fracture paths 222, 224 or along one of the contact surfaces as illustrated by the fracture path 226.

The first fracture path 222 is formed when the crack 220 propagates around each solder element 140. Although FIG. 2 depicts the first fracture path 222 extending around each solder element 140 toward the first contact surface 115, alternatively, the first fracture path 222 could extend over and/or around any one or more of the solder elements 140 toward the second contact surface 125. Although FIG. 2 depicts the first fracture path 222 as continuing around each subsequent solder element 140, in actuality, when the first fracture path 222 approaches each subsequent solder element 140, the first fracture path 222 may (i) travel around the solder element 140, (ii) travel through the solder element 140, (iii) travel along one of the contact surfaces 115, 125, or (iv) arrest at the interface of the adhesive 130 and the solder element 140.

The second fracture path 224 is formed when the crack 220 propagates through the solder element 140 and then propagates into the adhesive 130 prior to reaching a subsequent solder element 140. Similar to the first fracture path 222, when the second fracture path 224, reaches each subsequent solder element 140, the second fracture path 224 may (i) travel around any or all of the solder elements 140, (ii) travel through any of the solder elements 140, and/or (iii) at all times or any time travel along one of the contact surfaces 115, 125, or (iv) arrest at the interface of the adhesive 130 and one of the solder elements 140.

The third fracture path 226 is formed when the crack 220 propagates around the solder element 140 and along one of the contact surfaces 115, 125. Unlike the first and second fracture paths 222, 224, when the third fracture path 226 is formed, the crack 220 continues to propagate along the contact surface 115, 25 where the crack 220 commenced.

Alternately, the crack 220 may arrest at any interface of the adhesive 130 and the solder element 140 along the fracture paths 222, 224, 226. Arresting of the crack 220 may be highly desired within the bonding system 200 because reduced or eliminated propagation of the crack 220 may prevent failure of the bonding system 200 due to fracture.

FIG. 3 illustrates load, force (N) [y axis], versus displacement (mm) [x axis], of (i) an adhesive with no solder elements (represented by first data line 310) (ii) an adhesive including solder elements (represented by a second data line 320), and (iii) adhesive including solder elements where a flux coating is applied to one or more of the contact surfaces 115, 125 (represented by a third data line 330).

Generally, the first data line 310 has a force that is below that of the second and third data lines 320, 330, thus making an adhesive prone to fracture when compared with the adhesives containing solder elements. At varying displacements prior to fracture (e.g., displacement between approximately 0.5 mm and approximately 3.5 mm), the third data line 330 is generally above the second data line 320. Meaning the bonding system 200 assembled using the flux coating 150 on one or more of the contact surfaces 115, 125 can withstand a greater force over the same displacement when compared to a bonding system assembled without the use of the flux coating 150.

Illustrative Benefits

Many of the benefits and advantages of the present technology are described herein above. The present section presents in summary some of the benefits of the present technology.

The technology creates increased interlock between the solder element and the adhesive as compared to conventional techniques. Applying the flux coating to one or more substrate contact surfaces increases interlock between the solder-adhesive mixtures and the substrate contact surfaces which can lead to improved mechanical performance, such as peel strength, of the bond formed as compared to conventional techniques.

Embodiments of the technology prevents absorption of the flux coating into the solder-adhesive mixture. Heating solder-adhesive mixture prior to application on the substrate contact surface is intended to vaporize the flux, thus increasing interlock between the solder elements and the substrate contact surfaces.

The technology allows fracture to propagate along a path that dissipates or absorbs a greater amount of fracture energy than it would take to propagate directly through the bond line. Using solder elements promotes crack propagation along one of a pre-identified range of fracture paths that dissipate more fracture energy for crack propagation in the adhesive and increases energy-absorption capability of the bonding system.

CONCLUSION

Various embodiments of the present disclosure are disclosed herein. The disclosed embodiments are merely examples that may be embodied in various and alternative forms, and combinations thereof.

The above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A method, to produce a solder-reinforced adhesive bond joining a first substrate and a second substrate, comprising:
    applying, to a first contact surface of the first substrate, a flux coating;
    heating a solder-adhesive mixture comprising an adhesive and a plurality of solder elements to a flux-melting or flux-vaporizing temperature;
    applying, to the first contact surface, the solder-adhesive mixture thereby melting or vaporizing at least a portion of the flux coating upon contact therewith; and
    positioning, opposite the first contact surface, a second contact surface of the second substrate in contact with the solder-adhesive mixture.

2. The method of claim 1, wherein the solder-adhesive mixture is combined in a mixer prior to application of the solder-adhesive mixture to the first contact surface.

3. The method of claim 1, wherein the solder-adhesive mixture is heated to a flux melting temperature.

4. The method of claim 1, wherein the flux coating is applied to the second contact surface prior to positioning the second substrate in contact with the solder-adhesive mixture.

5. The method of claim 1, wherein at least one of the plurality of solder elements is in contact with the first contact surface.

6. The method of claim 1, wherein at least one of the plurality of solder elements is in contact with the first contact surface and the second contact surface.

7. The method of claim 1, wherein each of the plurality of solder elements is generally spherical.

8. A method, to produce a solder-reinforced adhesive bond joining a first substrate and a second substrate, comprising:

applying, to a first contact surface of the first substrate, a flux coating; heating an adhesive to a flux-melting or flux-vaporizing temperature;

applying, to the first contact surface, the adhesive thereby melting or vaporizing at least a portion of the flux coating upon contact therewith;

positioning within the adhesive, applied to the first contact surface, a plurality of solder elements, forming a solder-reinforced adhesive; and positioning, opposite the first contact surface, a second contact surface of the second substrate in contact with the solder-reinforced adhesive.

9. The method of claim 8, wherein the flux coating is applied to the second contact surface prior to positioning the second substrate in contact with the solder-reinforced adhesive.

10. The method of claim 8, wherein at least one of the plurality of solder elements is in contact with the first contact surface.

11. The method of claim 8, wherein at least one of the plurality of solder elements is in contact with the first contact surface and the second contact surface.

12. The method of claim 8, wherein each of the plurality of solder elements is generally spherical.

13. The method of claim 8, applying heat to the solder-reinforced adhesive by way of at least one of the first and second contact surfaces, wherein the plurality of solder elements reaches a solder-element bonding temperature.

* * * * *